United States Patent [19]
Skowronski

[11] Patent Number: 5,811,201
[45] Date of Patent: Sep. 22, 1998

[54] POWER GENERATION SYSTEM UTILIZING TURBINE AND FUEL CELL

[75] Inventor: Mark J. Skowronski, Walnut, Calif.

[73] Assignee: Southern California Edison Company, Rosemead, Calif.

[21] Appl. No.: 689,702

[22] Filed: Aug. 16, 1996

[51] Int. Cl.⁶ .................................................. H01M 8/06
[52] U.S. Cl. .............................................. 429/17; 204/269
[58] Field of Search .................................. 429/16, 26, 30, 429/34, 17; 204/269, 270, 241, 274; 60/723

[56] References Cited

U.S. PATENT DOCUMENTS

| | | | |
|---|---|---|---|
| 4,000,617 | 1/1977 | Fortescue | 60/644 |
| 4,369,624 | 1/1983 | Hamm et al. | 60/39.12 |
| 5,083,425 | 1/1992 | Hendriks et al. | 60/39.183 |
| 5,185,997 | 2/1993 | Nishijima | 60/39.07 |
| 5,202,633 | 4/1993 | Doty et al. | 324/321 |
| 5,319,925 | 6/1994 | Hendriks et al. | 60/39.183 |
| 5,325,059 | 6/1994 | Doty | 324/321 |
| 5,333,994 | 8/1994 | Doty et al. | 415/202 |
| 5,501,781 | 3/1996 | Hsu et al. | 204/269 |

OTHER PUBLICATIONS

Product Sheet: 24 kW Turbogenerator, Capstone Turbine Corporation, Rolling Hills Estates, CA, (1995) (month N/A).

Summary Report *ZTEK Advanced Planar ATI® SOFC For Electric Utility Power Generation*, ZTEK Corporation, Waltham, Massachusetts (1994) 12 pages (month N/A).

A. C. Pfahnl et al., *Key Issues in the General Design of Motor–Vehicle Gas–Turbine Engines*, ASME 95–GT–393, 8 pages Jun. 1995.

H. Minegishi et al., *Development of a Small Mixed–Flow Turbine For Automotive Turbochargers*, ASME 95–GT–53, 7 pages Jun. 1995.

S. M. Richardson et al., *The GUide Consortium: Government, Universities, and Industry Working Together to Develop New Technologies*, ASME 95–GT–278, 8 pages (Jun. 1995).

D. B. Fant et al., *A Collaborative Venture: The Advanced Gas Turbine Systems Research Program*, ASME 95–Gt–148, 5 pages Jun. 1995.

V. M. Parthasarathy, et al., *Material Characterization of Candidate Silicon Based Ceramics for Stationary Gas Turbine Applications*, ASME 95–GT–249, 10 pages Jun. 1995.

M. G. Jenkins, *Long–Term Testing of Advanced Ceramics: Concerns, Insights, and Recommendations*, ASME 95–GT–237, 9 pages Sep. 1995.

I. Shnaid, *Novel Compressed Air Energy Storage (CAES) Systems Applying Air Expanders*, ASME 95–GT–282, 13 pages Jun. 1995.

M.W. Rettler, et al., *Ceramic Gas Turbine Technology Development*, ASME 95–GT–207, 10 pages Jun. 1995.

M. Murota, et al., *Research and Development of 300kW Class Ceramic Gas Turbine (Development of the Static Ceramic Components for CGT303)*, ASME 95–GT–200, 13 pages Jun. 1995.

K. Nishio, et al., *Development of 300 kW Class Ceramic Gas Turbine (CGT302)*, ASME 95–GT–264, 8 pages Jun. 1995.

T. Murayama, et al., *Current Status of 300 kW Industrial Gas Turbine R&D In Japan*, ASME 95–GT–445, 6 pages Jun. 1995.

R. Nims, *Development of An Oilless, Gearless, and Bleedable Under Armor Auxiliary Unit*, ASME 95–GT–444, 12 pages Jun. 1995.

M. Tatsuzawa, *Development of 300 kW–Class Ceramic Gas Turbine (CGT301) Engine System*, ASME 95–GT–201, 7 pages Jun. 1995.

*Primary Examiner*—M. Nuzzolillo
*Attorney, Agent, or Firm*—Sheldon & Mak

[57] ABSTRACT

A system for generating electricity comprises a fuel cell, a heating stage, and an integral, power generator. The power generator comprises a compressor, an electricity generator and a turbine. Hot exhaust gas from the fuel cell is used for driving the turbine, which in turn drives the generator and the compressor. Both the fuel cell and the generator produce electricity. The compressor is used for compressing air for use in the fuel cell. A portion of the waste heat from the turbine drive gas is used for preheating the air utilized in the fuel cell.

13 Claims, 1 Drawing Sheet

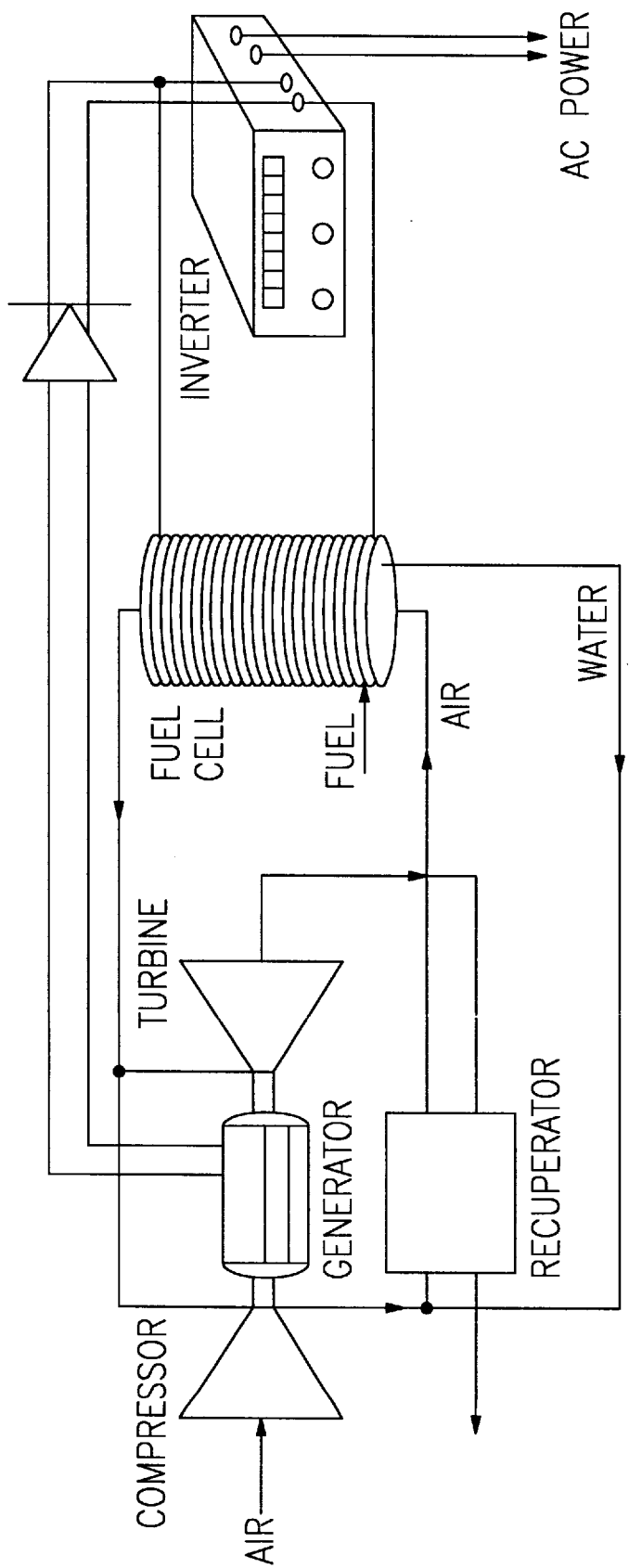

POWER GENERATION SYSTEM UTILIZING TURBINE AND FUEL CELL

BACKGROUND

The present invention is directed to a power generation system.

There is a need for systems for generating electrical energy with high efficiency and minimum environmental pollution. Conventional coal and nuclear plants generally achieve only about 35 percent efficiency. By efficiency, there is meant the amount of electrical energy produced as a percentage of potential energy present in the fossil fuel burned in the power plant. A conventional power installation typically has a capital cost of $600 per kilowatt (1996 dollars), with distribution charges adding to the capital and operating costs. Recently, General Electric has claimed it has systems that can achieve efficiencies as high as 60 percent, but only in large installations of about 350 megawatts.

Medium sized users of electricity, and users in remote locations, would like to have their own small power generation source. However, this is economical only if the capital and operating costs are comparable to those associated with large scale installations, if fuel efficiency is high, and if pollution problems are minimal. However, high efficiencies have not to date been obtainable for smaller size installations.

Attempts have been made to improve the efficiency of standard electricity generator systems, and at the same time lower the size required of a highly efficient system, by using fuel cells. For example, Hendricks et al. describe in their U.S. Pat. Nos. 5,083,425 and 5,319,925 an installation that includes a compressor unit driven by a turbine which receives compressed fluid after passage through an exhaust gas heat exchanger. The installation also includes a power generator driven by a gas turbine, with a fuel cell (typically a solid oxide design) that receives natural gas. The electrical power originating from both the generator and the fuel cell form the output of the installation. Difficulties associated with the Hendricks system are complexity and it has a high capital cost, in that it requires multiple turbines.

Accordingly, there is a need for small scale power installation units that have high energy efficiency, have capital and operating costs comparable to those of large scale installations, and create minimum pollution.

SUMMARY

The present invention is directed to a system for generating electricity that satisfies these needs. The system comprises as its main components (i) a fuel cell, (ii) a heat exchanger, also referred to as a heating stage or recuperator, and (iii) an integral power generator. The integral power generator comprises three units on a single shaft, namely a compressor, an electricity generator, and a turbine. This system operates on fossil fuel, preferably natural gas, and inexpensively and cleanly generates electricity.

In a process using the system, oxygen-containing gas, typically air, is introduced into a gas inlet of the compressor and compressed in the compressor. At least some of the compressed gas is then heated in the heating stage. Fuel and the compressed gas, serving as an oxygen source, are introduced into the fuel cell through an inlet, wherein the fuel is converted by oxidation to produce electricity, water, and hot a exhaust gas.

The electricity produced by the fuel cell is one source of electricity generated by this system. Additional electricity is produced by the turbine generator. This electricity is obtained by taking the fuel cell exhaust gas and introducing it into an inlet of the turbine as a drive gas for driving the turbine, which in turn, because they are on the same shaft, drives the generator and the compressor. The turbine operates at at least 50,000 RPM, and generally from about 70,000 to about 90,000 RPM. Thus, for a two-pole generator, the generator produces a high-frequency alternating current, typically at least 800 Hz, and generally from about 1,200 to about 1,600 Hz. The power from the generator can be converted to direct current, and then combined with the direct current electricity from the fuel cell. This combined direct current can then be inverted in an inverter to produce relatively low-frequency alternating current for consumption, typically having a frequency of 50 to 60 Hz.

Spent turbine drive gas, once discharged from the turbine through an outlet, is used for heating the oxygen-containing gas fed to the fuel cell in the heating stage by introducing spent turbine drive gas into an inlet of the heating stage.

Thus, due to the direct linking of the fuel cell with the power generator, inexpensive electricity is generated.

The exhaust gas from the fuel cell may be at a higher temperature, i.e. about 1800° F., than commercially available turbine power generators can operate, which is generally in the order of only about 1600°–1700° F. Therefore, preferably, the turbine drive gas includes a sufficient quantity of compressed gas from the compressor to maintain the turbine drive gas at a sufficiently low temperature that it does not damage the turbine.

It is also preferred that water be combined with the compressed air before it is introduced into the heat exchanger to maximize the heat recovery from the turbine exhaust gas. The water used for this purpose can be water generated in the fuel cell or from an independent source.

DRAWINGS

These and other features, aspects and advantages of the present invention will become better understood with reference to the following description, appended claims, and accompanying drawing, which is a process flow sheet of a system according to the present invention, wherein the principal components of the system are schematically shown.

DESCRIPTION

With reference to the only drawing figure, the main components of a system according to the present invention are:

(a) a power generator 10 comprising a compressor 12, an electrical generator 14, and a turbine 16, all sharing a common shaft 17;

(b) a fuel cell 18;

(c) a recuperator or regenerator 20, also referred to as a heating stage or heat exchanger;

(d) a rectifier 22; and (e) an inverter 24.

The power generation unit shown in the drawing has the compressor 12, the generator 14, and the turbine 16 mounted on the same shaft 17 in that sequential order, but that is not required. For example, the turbine 16 can be between the generator 14 and the compressor 12, or the compressor 12 can be between the generator 14 and the turbine 16.

A suitable power generator can be obtained from Capstone Turbine Corporation of Tarzana, Calif. The Capstone power generator referred to has a turbine 16 which generates about 24 kW. Another satisfactory power generation will be available from Allied Signal of Torrance, Calif., which has a turbine providing from about 40 to about 50 kW, and larger units are planned up to 200 kW.

The compressor 12 and the turbine 16, which turn on a common shaft with the generator 14 at high speed, can each or both be radial (centrifugal) design, or both can be an axial flow design. Other options are that the bearings required for the power generation unit 10 can be located on the shaft 17 with the generator 14 cantilevered on the shaft, or the generator 14 can be located between the bearings. Air bearings are preferred to reduce the complexity of the machine. The high speed generator 14 uses a permanent magnet to supply the necessary magnetic lines of force.

The fuel cell 18 catalytically converts methane to hydrogen and carbon dioxide with heat generation; and the hydrogen is then combined with oxygen in an oxygen-containing gas to generate electricity, plus waste heat and water.

Different types of fuel cells are suitable for use in the system of the invention. One type that can be used is a molten carbonate fuel cell. Also, a phosphoric acid fuel cell can be used. A low-temperature fuel cell, such as a proton exchange membrane or phosphoric acid can be used, but with less efficiency. The preferred fuel cell is a solid oxide fuel cell, which typically operates at a temperature from 1600° to 1800° F. A solid oxide fuel cell can be obtained from Westinghouse, Pittsburgh, Pa. The Westinghouse fuel cells can be obtained in any size, in 250 watt increments.

The heating stage 20 can be a fixed recuperator or a revolving regenerator.

The rectifier 22 is typically a diode system whose purpose is to convert high-frequency alternating current to direct current.

The purpose of the inverter 24 is to convert direct current to a low-frequency, alternating current, typically 50 to 60 Hz, for domestic use.

There will now be described how the system is used, with reference to Table I. Table I provides the temperature, pressure, and flow rates of the various streams of the system shown in the drawing.

TABLE I

Typical Process Parameters

| Stream | Temperature (°F.) | Pressure (psia) | Flow Rate (1000 lb/hr) |
| --- | --- | --- | --- |
| 32/Input air | ambient | ambient | 2–10 |
| 34/compressed air | 300–400 | 40–70 | 2–10 |
| 35/Recuperator feed | 300–400 | 40–70 | 2–10 |
| 36/Fuel Cell air input | 1,000–1,500 | 40–70 | 2–10 |
| 37/Fuel for fuel cell | as provided; (typically 70) | 40–70 (depends on operating pressure) | 30–40 (depends on unit size) |
| 46/Fuel cell exhaust gas | 1600–1800 | 40–70 | 2–10 |
| 48/Turbine inlet | 1,550–1,850 | 40–70 | 2–10 |
| 58/Turbine outlet | 1,200–1,500 | 15–20 | 2–10 |
| 56/Water to heating stage | 50–70 | 45–65 | 0–5% of air flow |
| 72/Recuperator outlet | 350–500 | ambient | 2–10 |

The inputs to the system are an oxygen-containing gas, typically air 32, and a fuel 34, which is typically natural gas, which is principally made up of methane. The input air 32 is used for oxidizing the fuel 34 in the fuel cell, after it is compressed and heated. The air 32 is first compressed in the compressor 12. The compressed oxygen-containing gas 34 is then heated in the heating stage 26, to produce the heated, compressed, input oxygen-containing gas stream 37 for the fuel cell 18. Although the oxygen-containing gas is typically air 32, it can be other gases containing oxygen, such as air partially depleted of oxygen, or air enriched with oxygen.

The outputs from the fuel cell 18 are direct current electricity 38, water 39, and hot exhaust gas 40. The temperature of the exhaust gas 40 depends upon the temperature at which the fuel cell operates. For efficiency, preferably the fuel cell 18 is operated at as high a temperature as possible, subject to the material limitations of the fuel cell. For the preferred fuel cell 18, this is in the order of about 1800° F.

The fuel cell by itself typically has an energy efficiency of about 45 percent. The purpose of the power generation unit 10 is to take advantage of the energy content of the hot exhaust gas 40 from the fuel cell. The efficiency of a commercially available power generation unit by itself, is typically about 30 percent. By combining the power generation unit 10 with the fuel cell 18, a system with an energy efficiency of about 60 percent results.

Accordingly, spent fuel cell exhaust gas 40 is used as a turbine drive gas 48 for driving the turbine 16. Because the generator 14 and compressor 12 are on the same shaft as the turbine, the generator 14 turns, producing alternating current electricity 50, and the compressor 12 compresses the input air stream 32 as described above. The frequency of the electricity 50 produced by the generator is at least 1,000 Hz, and typically is from about 1,200 to about 1,600 Hz.

The turbine 16 may not operate at as high a temperature as the fuel cell can operate. Accordingly, it may be necessary to reduce the temperature of the spent fuel cell gas 56. Preferably, a slip stream 52 of the air compressed by the compressor 12 is combined with the fuel cell exhaust gas 40 upstream of the turbine 16. These two gas streams combined yield the turbine drive gas 48.

Spent turbine drive gas 58 is used for heating the compressed air stream 34 in the heating stage 20. To maximize the recovery of the heat from the spent turbine drive gas 58, preferably a slip stream 56 of the water 39 produced in the fuel cell is introduced into the heating stage 20 with the compressed air stream 34 to attemperate the compressed air. A portion of the water vapor produced in the fuel cell is condensed before it is used to attemperate the compressed air. It is not necessary that the water used in the recuperator come from water produced in the fuel cell. Makeup water 61 from pump 63 can be used instead. Spent turbine drive gas is discharged from the recuperator through line 72.

The alternating current electricity 50 from the generator 14 is rectified in the rectifier 22 to direct current electricity 64. This direct current 64 is combined with the direct current 38 from the fuel cell, and inverted in the inverter 24 to produce alternating current power 66.

Rather than using a single inverter 24, two inverters can be used, one for the direct current 38 from the fuel cell and the other for the direct current 64 from the rectifier 22. The use of separate inverters is less preferred.

An advantage of the invention is that because of the relatively low pressure ratio used in the compressor 12, generally less than 4:1, intercooling between multiple compressor units, as required in some prior designs, is not needed.

EXAMPLE

A computer simulation of the system according to the present invention was run. Parameters for the process streams are presented in Table II.

TABLE II

Process Parameters for Example

| Stream | Temp (degree F.) | Pressure (psia) | Flow Rate (lb/hr) |
|---|---|---|---|
| 32/Input air | 59 | 14.7 | 2,220 |
| 34/Compressed air | 321 | 46 | 2,220 |
| 35/Recuperator feed | 283 | 46 | 2,242 |
| 36/Fuel Cell air input | 1,377 | 43 | 2,242 |
| 37/Fuel for fuel cell | 55 | 60 | 33 |
| 40/Fuel cell exhaust gas | 1,800 | 40 | 2,275 |
| 48/Turbine inlet | 1,800 | 40 | 2,275 |
| 58/Turbine outlet | 1,420 | 18 | 18 |
| 56/Water to heating stage inlet | 60 | 50 | 22 |
| 72/Recuperator outlet | 336 | 14.7 | 2,275 |

It was assumed that the heating value of the fuel was approximately 22,000 Btu/lb, ambient temperature was 59° F., ambient pressure was 14.7 psia, that the compressor had an efficiency of 0.77, the rectifier had an efficiency of 0.98, the inverter had an efficiency of 0.96, the generator had an efficiency of 0.94, the turbine efficiency was 0.85, and the fuel cell had an efficiency of approximately 45 percent. The auxiliary power load of the system was estimated at 3 kW, the pressure drop across the fuel cell was 0.5 psi, and the pressure drop across the piping system was 3 psi. The system operated at a pressure ratio of 3.2.

At these parameters, the system generates 113 kW, with energy efficiency of 57 percent.

Accordingly, a system according to the present invention can have an energy efficiency of about 60 percent, soon to be available, at a capital cost of approximately $1000 per kilowatt, with minimal transmission cost since they would be located at the user's site, for units sized at about 90 kW capacity.

Although the present invention has been described in considerable detail with reference to certain preferred versions thereof, other versions are possible. For example, rather than using a slip stream of compressed air for reducing the turbine inlet temperature, an external cooler, such as an air-to-air or air-to-water heat exchanger can be used.

As another option, a supplementary firing combustor can be added prior to the fuel cell, or a supplementary firing combustor can be added prior to the turbine input, or a supplemental firing combustor can be added in both locations, so that a smaller fuel cell apparatus can be used.

Therefore, the scope of the appended claims should not be limited to the description of the preferred versions contained herein.

What is claimed is:

1. A process for generating electricity utilizing an integral, power generator comprising a compression stage, an electricity generation stage, and a turbine stage all on the same shaft, the process comprising the steps of:
   (a) compressing an oxygen-containing gas in the compression stage;
   (b) heating at least some of the compressed gas in a heating stage;
   (c) introducing fuel and the compressed heated gas into a fuel cell for oxidizing the fuel therein to produce electricity, the fuel cell also producing hot exhaust gas;
   (d) driving the turbine stage with a turbine drive gas comprising fuel cell exhaust gas, the turbine stage being driven at a speed of a least 50,000 rpm, the turbine stage driving the electricity generation stage and the compression stage, the generation stage generating alternating current electricity; and
   (e) withdrawing spent fuel cell exhaust gas from the turbine stage and introducing the spent gas into the heating stage for heating the compressed oxygen-containing gas.

2. The process of claim 1 comprising the additional step of introducing water into the heating stage with compressed gas to increase the amount of heat recovered from the spent gas.

3. The process of claim 2 wherein the fuel cell produces water, and wherein the step of introducing water into the heating stage comprises introducing water produced by the fuel cell.

4. The process of claim 1 wherein the turbine drive gas comprises sufficient compressed oxygen-containing gas that the turbine drive gas has a temperature sufficiently low that the turbine stage is not damaged by the turbine drive gas.

5. The process of claim 4 wherein the fuel cell operates at a higher temperature than does the turbine stage.

6. The process of claim 1 wherein the fuel cell operates at a higher temperature than does the turbine stage.

7. The process of claim 1 comprising the step of rectifying the alternating current to direct current, and inverting both direct currents to low frequency alternating current.

8. The process of claim 1 wherein the low frequency alternating current electricity is at about 50 to about 60 Hz.

9. A process for generating electricity utilizing an integral, power generator comprising a compression stage, an electricity generation stage, and a turbine stage all on the same shaft, the process comprising the steps of:
   (a) compressing an oxygen-containing gas in the compression stage;
   (b) introducing compressed oxygen-containing gas and water into a heating stage to produce a hot, compressed, oxygen-containing gas;
   (c) introducing a methane-containing fuel and the hot, compressed, oxygen-containing gas into a fuel cell for oxidizing the fuel therein to produce direct current electricity, the fuel cell also producing hot fuel cell exhaust gas;
   (d) combining the fuel cell exhaust gas with sufficient compressed oxygen-containing gas to produce a turbine drive gas having a temperature sufficiently low that the turbine stage is not damaged by the turbine drive gas, and driving the turbine stage with turbine drive gas at a speed of a least 50,000 rpm so that the turbine stage drives the electricity generation stage and the compression stage, the generation stage generating high frequency alternating current electricity;
   (e) withdrawing spent fuel cell exhaust gas from the turbine stage and introducing the spent gas into the heating stage for heating the compressed oxygen-containing gas; and
   (f) rectifying the alternating current electricity to generator-produced direct current electricity, and inverting both the fuel cell-produced direct current electricity and the generator-produced direct current electricity to low-frequency alternating current.

10. A system for generating electricity comprising:
   (a) an integral, power generator comprising a compressor, an electricity generator, and a turbine, all on the same shaft, the compressor having a gas inlet for introducing an oxygen-containing gas into the compressor to generate a compressed oxygen-containing gas;

(b) a heating stage for heating at least some of the compressed oxygen-containing gas;

(c) a fuel cell for converting a fuel, in the presence of an oxygen source, into direct current electrical energy, the fuel cell having a gas inlet for receiving heated compressed oxygen-containing gas from the heating stage for use in the fuel cell as the oxygen source, the fuel cell also producing a hot exhaust gas;

(d) wherein the turbine stage has an inlet for turbine drive gas comprising fuel cell exhaust gas so that the turbine drives the generator and the compressor, the generator generating alternating current electricity, and wherein the turbine stage has an outlet for hot spent drive gas; and (e) wherein the heating stage has an inlet for the hot spent drive gas for heating the compressed oxygen-containing gas.

11. The system of claim 10 comprising a rectifier for rectifying the alternating current electricity to generator-produced direct current electricity.

12. The system of claim 11 comprising an invertor for inverting both the fuel cell-produced direct current electricity and the generator-produced direct current electricity to low-frequency alternating current.

13. The system of claim 10 comprising a mixer for mixing the fuel cell exhaust gas with sufficient compressed oxygen-containing gas to produce a turbine drive gas having a temperature sufficiently low that the turbine stage is not damaged by the turbine drive gas.

* * * * *

Adverse Decision In Interference

Patent No. 5,811,201, Mark J. Skowronski, POWER GENERATION SYSTEM UTILIZING TURBINE AND FUEL CELL, Interference No. 104,561, final judgment adverse to the patentee rendered September 26, 2001, as to claims 10-13.

*(Official Gazette October 23, 2001)*